United States Patent [19]

Kitoo et al.

[11] Patent Number: 4,529,651
[45] Date of Patent: Jul. 16, 1985

[54] MAGNETIC RECORDING MEDIUM HAVING ORGANIC PROTECTIVE OVERLAYER

[75] Inventors: Makoto Kitoo; Yoshinori Honda; Yuuichi Kokaku, all of Yokohama, Japan

[73] Assignee: Hitachi, Ltd., Tokyo, Japan

[21] Appl. No.: 458,059

[22] Filed: Jan. 14, 1983

[30] Foreign Application Priority Data

Jan. 18, 1982 [JP] Japan .................................. 57-5049

[51] Int. Cl.³ .............................................. G11B 5/72
[52] U.S. Cl. ................................. 428/336; 360/134;
360/135; 360/136; 204/192 M; 204/192 D;
427/128; 427/131; 428/694; 428/900
[58] Field of Search ............... 428/694, 695, 900, 336;
427/132, 131, 128; 204/192 M, 192 D;
360/134–136

[56] References Cited

U.S. PATENT DOCUMENTS

| 4,333,985 | 6/1982 | Shirahata | 428/694 |
| 4,390,601 | 6/1983 | Ono | 428/900 |
| 4,401,725 | 8/1983 | Ozawa | 428/900 |
| 4,448,843 | 5/1984 | Yamada | 428/900 |

Primary Examiner—Ellis P. Robinson
Attorney, Agent, or Firm—Antonelli, Terry & Wands

[57] ABSTRACT

A magnetic recording medium produced by forming an organic protective layer on a magnetic recording layer by sputtering conducted in an inert gas atmosphere using a material for forming the organic protective layer as cathode and the magnetic recording layer as anode has excellent lubricating properties and wear resistance.

19 Claims, 2 Drawing Figures

MAGNETIC RECORDING MEDIUM HAVING ORGANIC PROTECTIVE OVERLAYER

This invention relates to a magnetic recording medium having an organic protective overlayer and a process for producing the same. More particularly, this invention relates to a magnetic recording medium having an organic protective layer formed on a surface of magnetic recording layer of a magnetic disk, a magnetic drum, a magnetic head, a magnetic tape, etc., and a process for producing the same.

A magnetic disc apparatus comprises a spinning magnetic disc having a magnetic recording layer on a surface thereof and a magnetic head facing oppositely with a constant gap so as to conduct recording and reproducing. In such an apparatus, when the thickness of the magnetic recording layer is made thinner and the gap between the magnetic disc and the magnetic head smaller, the recording density can be larger. But the thinner the thickness of the magnetic recording layer and the smaller the gap between the magnetic disc and the magnetic head become, more often damages are produced on the magnetic recording layer or the magnetic head due to direct contact of the magnetic head to the surface of the magnetic disc by floating dust particles and abnormal vibrations.

On the other hand, in a contact-start-stop system magnetic disc apparatus wherein a magnetic head contacts with the surface of a magnetic disc at a time of stoppage and the magnetic head is floated by an air stream caused by the rotation of the magnetic disc, there is a great fear for damaging the magnetic recording layer or breaking the magnetic head, since the magnetic disc surface contacts with the magnetic head without fail at the time of start or stop. In order to avoid such damage, a lubricant is coated on the surface of the magnetic disc by a coating method or the like to form a protective film. But it is very difficult to coat the lubricant uniformly on the surface of the magnetic disc. If the lubricant is coated too much on some portions, there is caused a sticking state between the magnetic head and the magnetic disc so as to make it difficult to start, while if the lubricant is coated too little on some portions, there are caused damages on the surface of the magnetic disc and the magnetic head when the magnetic head contacts with the magnetic disc.

It is objects of this invention to provide a magnetic recording medium having an organic protective overlayer uniformly formed on a magnetic recording layer for providing lubricating properties and a process for producing the same.

It is further objects of this invention to provide a magnetic recording medium having an organic protective overlayer uniformly formed on a magnetic recording layer for providing lubricating properties and wear resistance, and a process for producing the same.

This invention provides a magnetic recording medium comprising a substrate, a magnetic recording layer formed on a surface of the substrate, and an organic protective layer formed on the magnetic recording layer, said organic protective layer being produced by sputtering conducted in an inert gas atmosphere using a material for forming the organic protective layer as cathode and the magnetic recording layer as anode.

This invention also provides a process for producing a magnetic recording medium having an organic protective layer which comprises forming an organic protective layer on a magnetic recording layer, which has been formed on a surface of a substrate, by sputtering conducted in an inert gas atmosphere using a material for forming the organic protective layer as cathode and the magnetic recording layer as anode.

In the attached drawings.

In this invention, there can be used conventional substrates for magnetic discs, magnetic drums, magnetic cards, magnetic heads, magnetic tapes, etc., made of brass, aluminum, synthetic resins, etc.

The magnetic recording layer such as a suitable ferromagnetic layer can be formed on the substrate by a conventional method.

As the material for forming the organic protective layer, there can preferably be used organic polymers containing at least one atom selected from the group consisting of oxygen, nitrogen and sulfur in their molecular chain. Examples of such polymers are armomatic polyimides, aromatic polyamides, aromatic polyamide-imides, polyphenylene oxides, polyphenylene sulfides, aromatic polyurethanes, polyimidazopyrrolones, poly(benzoic acid ester)s, polyoxadiazoles, polybenzothiazoles, polyquinoxalines, polysulfones, etc.

The sputtering can be conducted by using a direct current, low-frequency, or high-frequency. The applied electrical power cannot be determined singly depending on direct current, low-frequency and high-frequency. For example, it is preferable to employ the applied electric power of 0.1–50 W/cm$^2$ in the case of high-frequency of 10 kHz–10 GHz.

It is preferable to conduct the sputtering in an inert gas of at least one member selected from the group consisting of Ar, He and Xe, or a mixed gas of at least one of Ar, He and Xe and at least one of $O_2$, $N_2$ and a halogen gas. The pressure of gas atmosphere for sputtering may be any pressure for producing glow discharge and preferably $10^{-4}$ to 1 torr.

The thickness of the organic protective layer is 20–5000 Å, preferably 50–500 Å. Such a thin layer cannot be obtained by a dipping method, or the like usual coating method.

The organic protective layer can be formed on both surfaces of magnetic recording layers of, for example, a magnetic disc when said magnetic disc has two magnetic recording layers.

This invention is illustrated by way of the following Examples.

EXAMPLES

Figure 1:
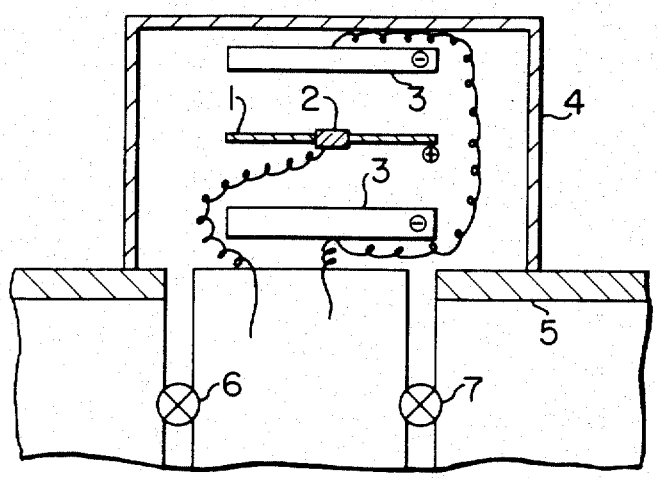
FIG. 1 is a schematic diagrams of sputtering apparatus.

A magnetic disc 1 as shown in FIG. 1 having a magnetic recording layer (not shown in the drawing) was fixed to an anode 2. A material for forming an organic protective layer shown in Table 1 was positioned as a cathode 3 facing to the magnetic disc 1 as shown in FIG. 1. Then, a chamber 4 was mounted on a chamber fixing plate 5.

In the next plate, the air in the chamber 4 is removed by a vacuum pump from an exhaust vent 7 to give a vacuum. Subsequently, argon gas was introduced into the chamber 4 from an inlet 6 so as to make the pressure $1 \times 10^{-2}$ torr. Sputtering was conducted by applying a high-frequency electric power of 13.56 MHz between the two electrodes to give organic protective layers of 500 Å thick.

Then, wear resistance of the resulting organic protective layers were evaluated in terms of sliding strength on a spherical surface. That is, an organic protective layer was contacted with a sapphire slide runner with a load of 10 g and a magnetic disc was rotated at a peripheral speed of 5 m/sec, 10 m/sec or 15 m/sec. The rotating number at which the organic protective layer was lost by wearing was evaluated as wear resistance.

The results are shown in Table 1. As is clear from Table 1, when the organic protective layers are formed on magnetic recording layers by using the organic polymers of Run Nos. 1 to 6 as cathode, the resulting organic protective layers show excellent wear resistance, while when the organic polymers of Run Nos. 7 to 11 are used, the forming of protective layers is very difficult and thus wear resistance cannot be measured or if formed, the volumes are very low. A reason for this is not clear, but it seems that since the polymers of Run Nos. 1 to 6 have at least one atom selected from the group consisting of oxygen, nitrogen and sulfur in their molecular chain, secondary bonding strength between molecular chains is enhanced to increase wear resistance.

Figure 2:
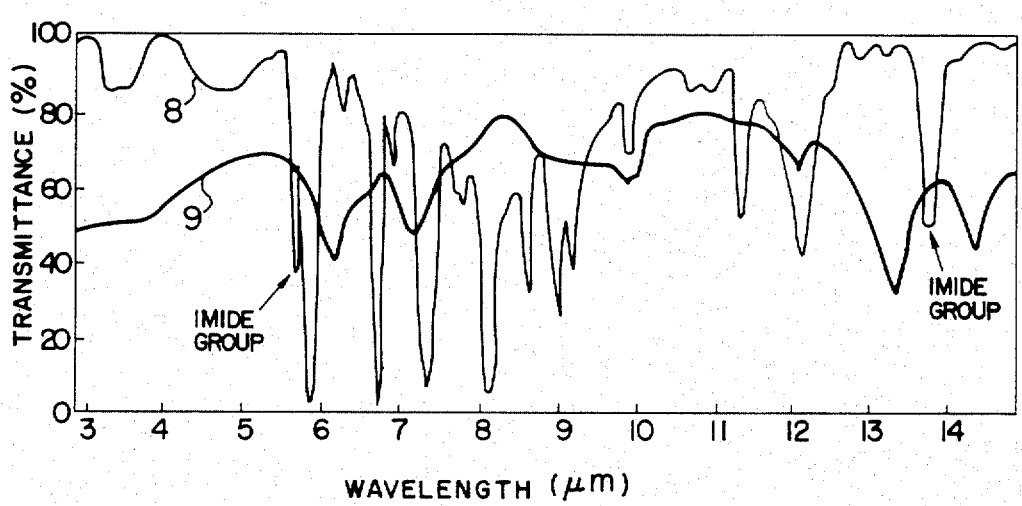
FIG. 2 is an infrared absorption spectrum chart showing IR absorption spectrum of starting polyimide used as cathode and that of the organic protective layer formed by sputtering.

The structure of the organic protective layer obtained by sputtering can be estimated by infrared absorption spectra shown in FIG. 2. In FIG. 2, the curve 8 is an infrared absorption spectrum of the polyimide of Run No. 1 in Table 1 and the curve 9 is that of the organic protective layer produced therefrom. FIG. 2 clearly shows the difference in structure between the starting polymer material and the resulting organic protective layer.

TABLE 1

| Run No. | Starting polymer | Trade name (Manufacturer) | Sputtering conditions Frequency (MHz) | Applied electrical power (W/cm$^2$) | Atmosphere | Film thickness (Å) | Wear resistance (Rotating no.) Peripheral speed (m/sec) 5 | 10 | 15 |
|---|---|---|---|---|---|---|---|---|---|
| 1 | Polyimide | Kapton (E. I. du Pont de Nemours & Co.) | 13.56 | 0.7 | Argon $1 \times 10^{-2}$ Torr | 500 | 25000 | 20000 | 18000 |
| 2 | Polyimide | Kerimid (Rhone-Poulenc S.A.) | " | " | Argon $1 \times 10^{-2}$ Torr | " | 23000 | 20000 | 17000 |
| 3 | Polyamide-imide (aromatic) | TI-1000 (Toray Ind., Inc.) | " | " | Argon $1 \times 10^{-2}$ Torr | " | 24000 | 19000 | 18000 |
| 4 | Polyphenylene oxide | PPO resin (General Elect.) | " | " | Argon $1 \times 10^{-2}$ Torr | " | 16000 | 13000 | 11000 |
| 5 | Polybenzoic acid ester | Ekonol (Sumitomo Chem. Co.) | " | " | Argon $1 \times 10^{-2}$ Torr | " | 17000 | 14000 | 12000 |
| 6 | Polyphenylene sulfide | (Shin-etsu Chem. Industry Co., Ltd.) | " | " | Argon $1 \times 10^{-2}$ Torr | " | 22000 | 17000 | 14000 |
| 7 | Polytetrafluoroethylene | Teflon (E. I. du Pont de Nemours & Co.) | " | " | Argon $1 \times 10^{-2}$ Torr | " | 2800 | 1600 | 1500 |
| 8 | Polystyrene | Styron (Asahi-Dow Ltd.) | " | " | Argon $1 \times 10^{-2}$ Torr | Film formation is very difficult | — | — | — |
| 9 | Polyamide-imide (aliphatic) | UBE Nylon (Ube Industries, Ltd.) | " | " | Argon $1 \times 10^{-2}$ Torr | Film formation is very difficult | — | — | — |
| 10 | Polyacrylonitrile | Tyril (Asahi-Dow Ltd.) | " | " | Argon $1 \times 10^{-2}$ Torr | Film formation is very difficult | — | — | — |
| 11 | Polymethyl methacrylate | Acrypet (Mitsubishi Rayon Co., Ltd.) | " | " | Argon $1 \times 10^{-2}$ Torr | Film formation is very difficult | — | — | — |

What is claimed is:

1. A process for producing a magnetic recording medium having an organic protective layer which comprises forming an organic protective layer on a magnetic recording layer, which has been formed on a surface of a substrate, by sputtering conducted in an inert gas atmosphere or mixed gas atmosphere using a material for forming the organic protective layer as cathode and the magnetic recording layer as anode, wherein the material for forming the organic protective layer is at least one member selected from the group consisting of an aromatic polyimide, an aromatic polyamide, an aromatic polyamide-imide, a polyphenylene oxide, a polyphenylene sulfide, an aromatic polyurethane, a polyimidazopyrrolone, a polybenzoic acid ester, a polyoxadiazole, a polybenzothiazole, a polyquinoxaline and a polysulfone.

2. A process according to claim 1, wherein the sputtering is conducted in an inert gas of at least one member selected from the group consisting of argon, helium and xenon under a vacuum of $10^{-4}$ to 1 torr at an applied electrical power of 0.1 to 50 W/cm$^2$ and a frequency of 10 kHz to 10 GHz.

3. A process according to claim 1, wherein the material for forming the organic protective layer is at least one member selected from the group consisting of an aromatic polyimide, an aromatic polyamide-imide , a polyphenylene oxide, a polyphenylene sulfide, a polyimidazopyrrolone, a polybenzoic acid ester, a polyoxadiazole, a polybenzothiazole, a polyquinoxaline and a polysulfone.

4. A process according to claim 1, wherein the material for forming the organic protective layer is at least one member selected from the group consisting of an aromatic polyimide, an aromatic polyamide, an aromatic polyamide-imide, a polyphenylene oxide, a polyphenylene sulfide, an aromatic polyurethane, a polybenzoic acid ester, a polybenzothiazole, and a polyquinoxaline.

5. A process according to claim 1, wherein the material for forming the organic protective layer is at least one member selected from the group consisting of aromatic polyimide and aromatic polyurethane.

6. A process according to claim 1, wherein the material for forming the organic protective layer is at least one member selected from the group consisting of an aromatic polyurethane, an aromatic polyimide, an aromatic polyamide-imide, a polyphenylene oxide, a polyphenylene sulfide, a polyimidazopyrrolone, a polybenzoic acid ester, a polyoxadiazole, a polybenzothiazole, a polyquinoxaline and a polysulfone.

7. A process according to claim 1, wherein the sputtering is conducted in a mixed gas, said mixed gas being at least one of Ar, He and Xe and at least one of $O_2$, $N_2$ and a halogen gas.

8. A process according to claim 1, wherein the organic protective layer is formed to have a thickness of 20-5000 Å.

9. A process according to claim 8, wherein said thickness is 50-500 Å.

10. A process according to claim 1, wherein the sputtering is conducted in an inert gas.

11. A process according to claim 10, wherein the inert gas is at least one member selected from the group consisting of Ar, He ad Xe.

12. A magnetic recording medium comprising a substrate, a magnetic recording layer formed on a surface of the substrate, and an organic protective layer formed on the magnetic recording layer, said organic protective layer being produced by sputtering conducted in an inert gas atmosphere or a mixed gas atmosphere using a material for forming the organic protective layer as cathode and the magnetic recording layer as anode, wherein the material for forming the organic protective layer is at least one member selected from the group consisting of an aromatic polyimide, an aromatic polyamide, an aromatic polyamide-imide, a polyphenylene oxide, a polyphenylene sulfide, an aromatic polyurethane, a polyimidazopyrrolone, a polybenzoic acid ester, a polyoxadiazole, a polybenzothiazol, a polyquinoxaline, and a polysulfone.

13. A magnetic recording medium according to claim 12, wherein the sputtering is conducted in an inert gas of at least one member selected from the group consisting of argon, helium and xenon under a vacuum of $10^{-4}$ to 1 torr at an applied electrical power of 0.1 to 50 W/cm$^2$ and a frequency of 10 kHz to 10 GHz.

14. A magnetic recording medium according to claim 12, wherein said organic protective layer has a thickness of 20-5000 Å.

15. A magnetic recording medium according to claim 14, wherein said thickness is 50-500 Å.

16. A magnetic recording medium according to claim 12, wherein the material for forming the organic protective layer is at least one member selected from the group consisting of an aromatic polyimide, an aromatic polyamide-imide, a polyphenylene oxide, a polyphenylene sulfide, a polyimidazopyrrolone, a polybenzoic acid ester, a polyoxadiazole, a polybenzothiazole, a polyquinoxaline, and a polysulfone.

17. A magnetic recording medium according to claim 12, wherein the material for forming the organic protective layer is at least one member selected from the group consisting of an aromatic polyimide, an aromatic polyamide, an aromatic polyamide-imide, a polyphenylene oxide, a polyphenylene sulfide, an aromatic polyurethane, a polybenzoic acid ester, a polybenzothiazole, and a polyquinoxaline.

18. A magnetic recording medium according to claim 12, wherein the material for forming the organic protective layer is at least one member selected from the group consisting of aromatic polyimide and aromatic polyurethane.

19. A magnetic recording medium according to claim 12, wherein the material for forming the organic protective layer is at least one member selected from the group consisting of an aromatic polyurethane, an aromatic polyimide, an aromatic polyamide-imide, a polyphenylene oxide, a polyphenylene sulfide, a polyimidazopyrrolone, a polybenzoic acid ester, a polyoxadiazole, a polybenzothiazole, a polyquinoxaline, and a polysulfone.

* * * * *